United States Patent Office 3,268,077
Patented August 23, 1966

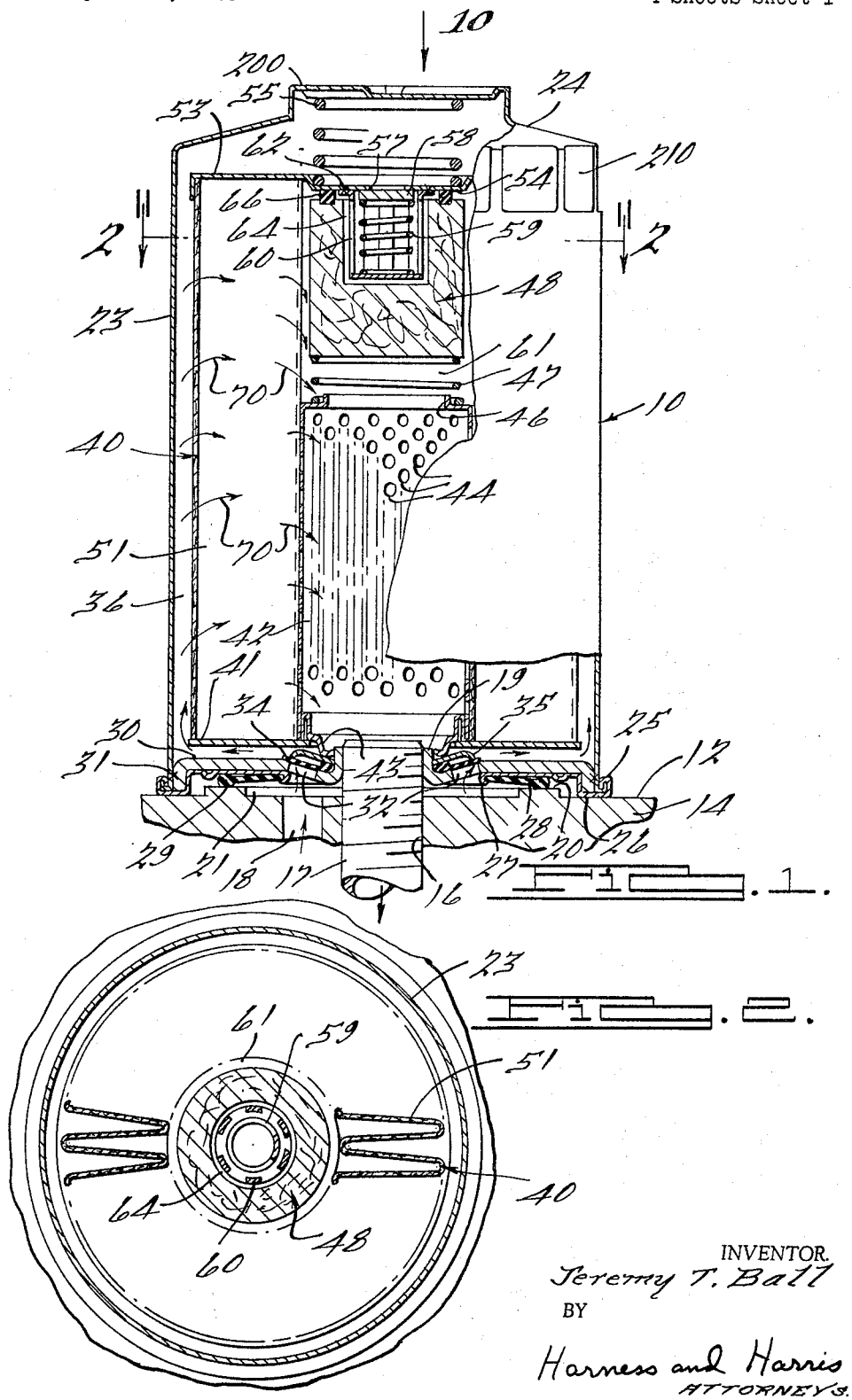

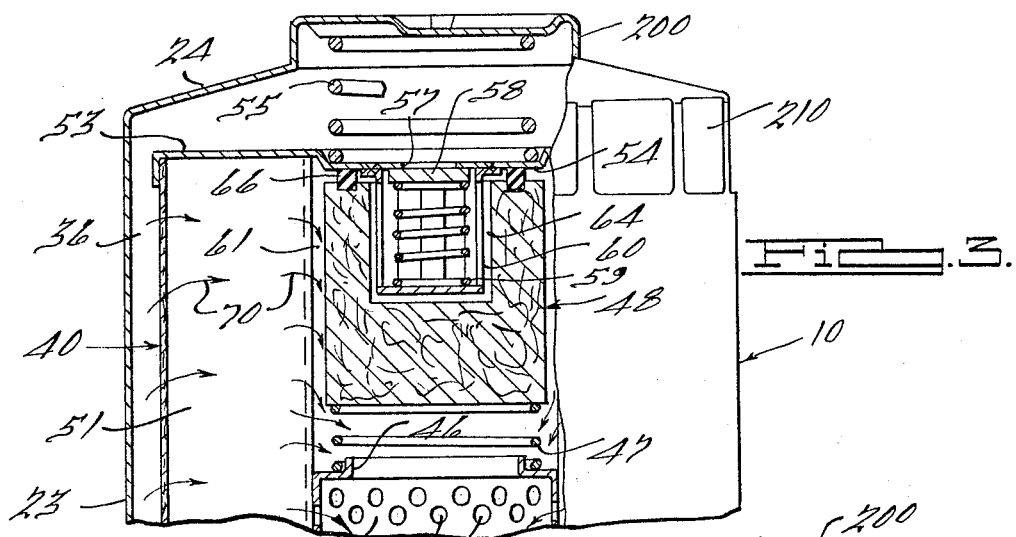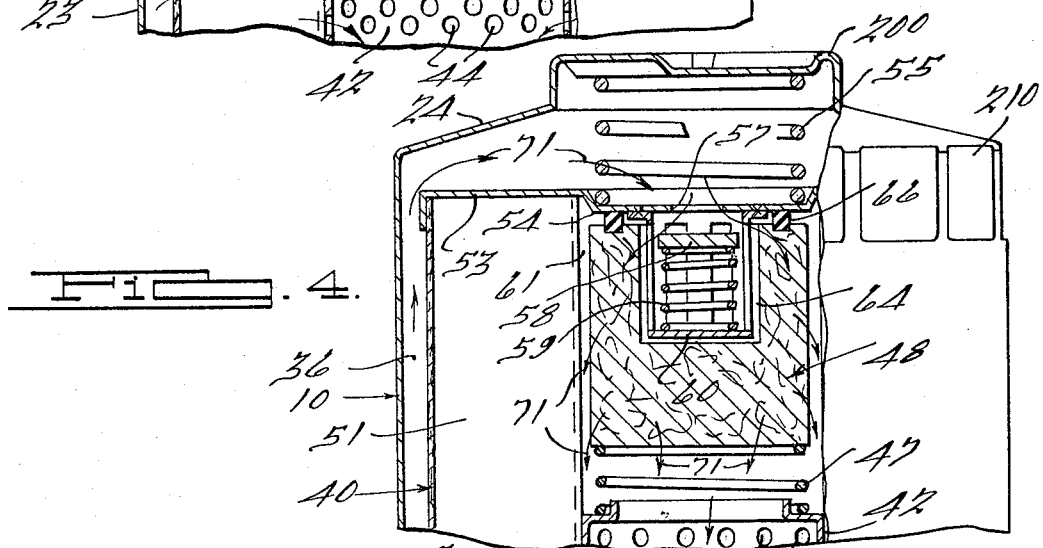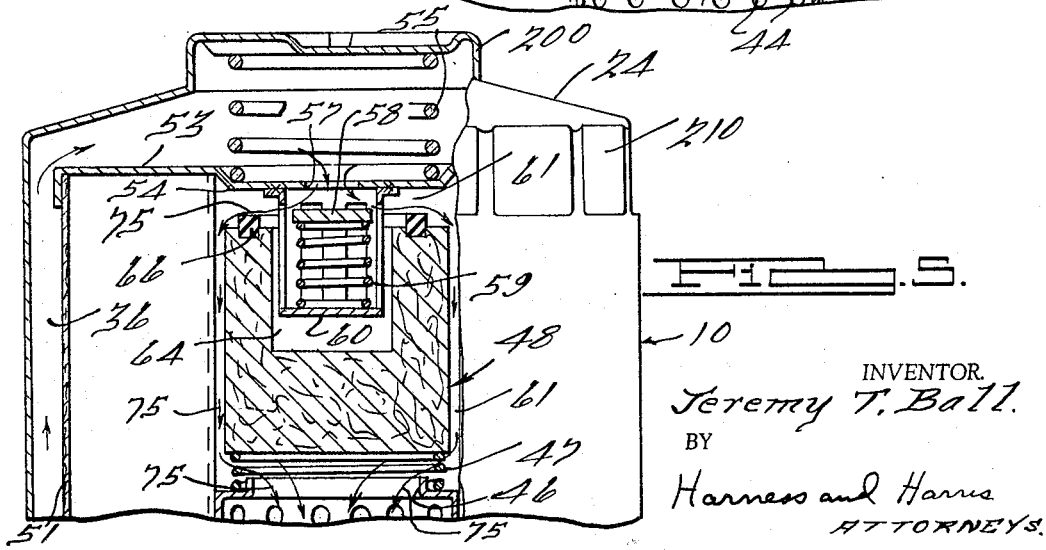

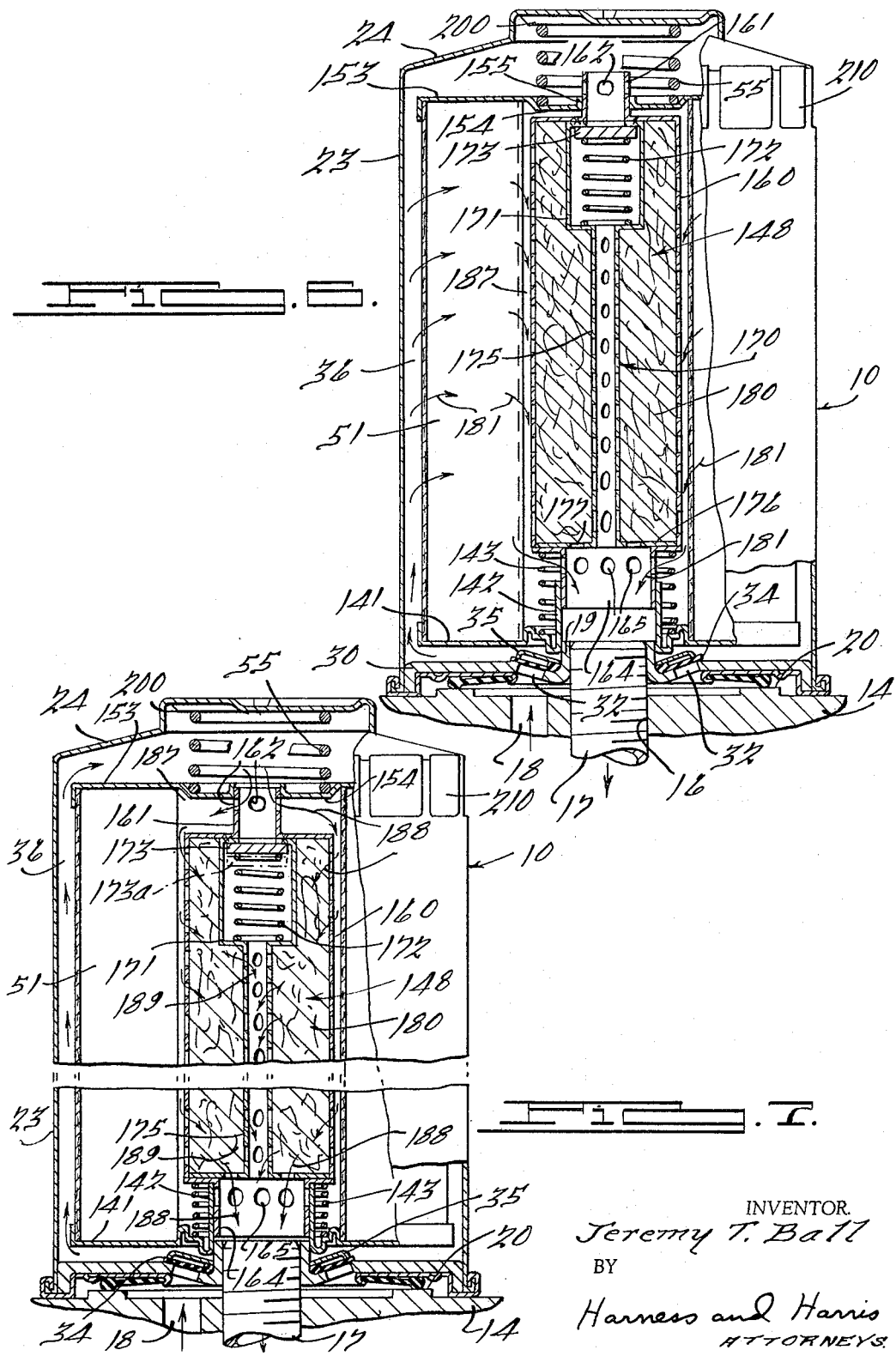

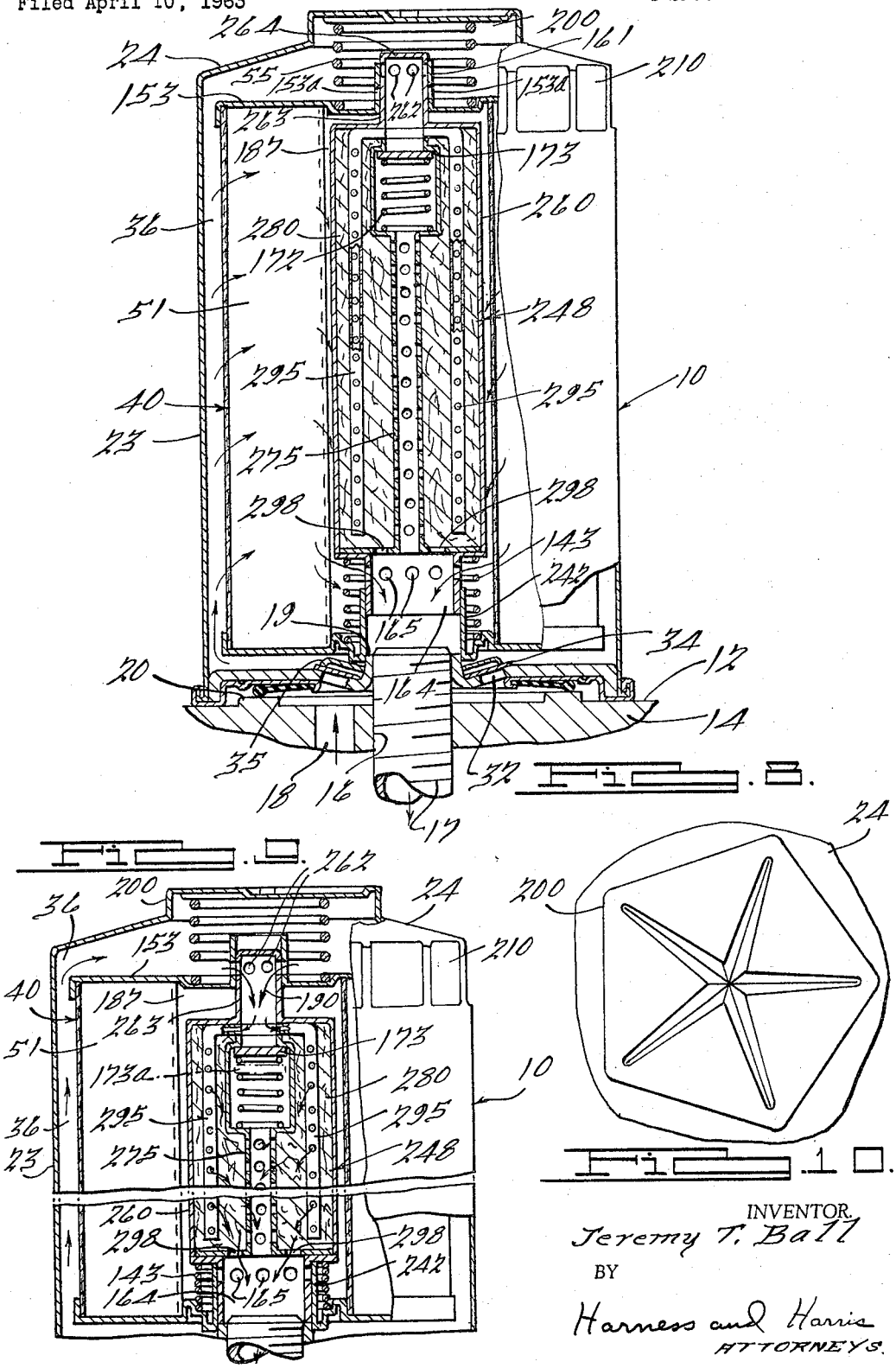

3,268,077
DUAL ELEMENT, DUAL VALVE FILTER
Jeremy T. Ball, Birmingham, Mich., assignor to Chrysler Corporation, Highland Park, Mich., a corporation of Delaware
Filed Apr. 10, 1963, Ser. No. 272,057
8 Claims. (Cl. 210—131)

This invention relates to fluid filters, particularly to the type which may be employed to filter the engine lubricating oil of an automotive engine or the like. The particular invention is shown applied to a so-called throwaway type filter although the inventive concept could be readily applied to the repacement cartridge type of filter as well.

It is a primary object of this invention to provide a new and improved type of oil filter having a plurality of by-pass valves and a plurality of filtering media arranged in a novel manner to provide different degrees or stages of filtering during the life of the filter and to thereby materially extend the life of the filter.

It is another object of this invention to provide a multi-stage filter that provides the maximum filtering capacity and life while utilizing minimum space because of the nested arrangement of the several filtering media.

It is still another object of this invention to provide a multi-stage filter unit wherein at least one of the several filter media of the unit is resiliently supported and arranged such that build-up of a predetermined fluid pressure head within the filter casing will unseat said resiliently supported filter media and provide a by-pass route for the fluid.

It is a further object of this invention to provide a multi-stage filter unit using at least a pair of filter media that may have different filtering rates or capacities wherein fluid pressure responsive valve means are arranged so as to provide either parallel or series flow through the several filtering media.

Other objects and advantages of this invention will become readily apparent from a consideration of the following description and the related drawings wherein:

FIG. 1 is a sectional elevational view of a throwaway type oil filter embodying one form of this invention;

FIG. 2 is a sectional elevational view taken along the line of and looking in the direction of the arrows 2—2 of FIG. 1;

FIG. 3 is an enlarged fragmentary sectional elevational view of the upper end portion of the filter unit shown in FIGS. 1 and 2, the filter unit being shown in its so-called first stage of filtering operation;

FIG. 4 is another fragmentary sectional elevational view, similar to FIG. 3, but showing the filter unit components in the so-called second stage of filtering;

FIG. 5 is another fragmentary sectional elevational view similar to FIG. 3, but showing the filter unit in the so-called third stage of its filtering operation;

FIG. 6 is a sectional elevational view of a modified form of this invention that also embodies a three-stage filtering process, the filter elements being shown in the so-called first stage of filtering operation;

FIG. 7 is a sectional elevational view of the FIG. 6 embodiment but showing the filter unit in a so-called second stage of filtering operation;

FIG. 8 is a sectional elevational view of still another modified form of this invention with the filter elements shown in the so-called first stage of filtering operation;

FIG. 9 is a fragmentary sectional elevational view of the upper end of the filter unit shown in FIG. 8, with the filter elements being shown in the so-called second stage of filtering operation; and FIG. 10 is a fragmentary top plan elevational view of the top or outer end of the filter casing.

Looking first at the form of the invention shown in FIGS. 1 through 5, the reference numeral 10 indicates the throwaway filter element that embodies one form of this invention. Filter element 10 is particularly well adapted for filtering the engine oil of an automotive engine. The manner in which the filter element may be connected to the automotive engine may be varied considerably. In the illustrated arrangement, the throwaway oil filter 10 is adapted to be sealingly mounted against a surface 12 of the engine block 14. It will be seen that the engine block 14 has a threaded opening 16 to which the filter element 10 is adapted to be detachably connected. The opening 16 provides the outlet conduit for the filter unit 10. The engine block bore or opening 16 may be formed at its upper end with an integral threaded nipple to threadably receive the filter unit 10 or in the alternative an adaptor pipe such as the pipe 17 may be mounted in the block bore 16 with its upper end projecting above the block surface 12 for reception of a mating threaded portion 19 on the bottom end of the filter unit 10. Extending annularly around the block bore 16 is a raised collar formation 20 that provides the seat against which the lower end of the filter unit 10 is sealingly mounted. Piercing the engine block 14 is one or more bores 18 that provide the inlet or supply ports for the oil that is to be introduced to the filter unit 10 during the filtering operation. Supply port 18 may, as shown, empty into a recessed area 21 that is bounded by the raised seat collar 20.

Filter unit 10 comprises a cup-like casing or a housing formed from a cylindrical side wall sleeve 23 that is integrally connected to a top wall portion 24. The bottom ends 25 of the side wall sleeve 23 have permanently fastened thereto by a rolled connection, or any other equivalent connecting means, a bottom disc 26. Disc 26 comprises a stepped washer that has the inner edge 27 thereof rolled over to provide a seat for the resilient sealing ring 28. Ring 28 may have an enlarged outer peripheral rim 29 that is adapted to be compressively sealed against the engine block collar formation 20. Mounted on the inner side of the bottom disc 26 is a relatively rigid bottom support plate 30. The plate 30 may be welded to the container side wall sleeve 23 as indicated at 31. Bottom plate 30 is pierced by a plurality of bores 32 that provide inlet ports for the transfer of oil from the chamber 21 to the interior of the filter unit 10. As previously noted, the inner periphery of the bottom plate 30 is turned upwardly to provide the threaded connector portion 19 that is threadably connectible to the upper end of the engine block nipple 17. The upturned inner periphery of the bottom plate 30 also provides a collar or flange on which the spring pressed one-way valve mechanism for the fluid inlet ports 32 is mounted. This one-way valve mechanism comprises a rubber-like washer 34 that has a spring finger disc 35 overlying the disc 34. It is thought to be obvious that pressurized fluid in the supply chamber 21 can raise the disc 34 and the spring fingers 35 to permit entry of fluid from conduit 18 into the cavity 36 within the filter unit 10. The one-way valve mechanism 34, 35 prevents back flow of the fluid in the filter unit 10 when the pressure in the supply conduit 18 drops to a low value.

The upturned bottom plate collar portion 19 also supplies the support means for the filter cartridge unit which is generally designated 40. This filter cartridge unit 40 comprises a bottom disc 41 that is mounted on the lower end of a perforated sleeve 42. The lower end of the perforated sleeve 42 is shaped to provide a neck 43 that surrounds and is seated on the upper end of the casing bottom plate 19. The perforations 44 in the sleeve 42 serve a purpose which will be described hereafter. The upper end of the perforated sleeve 42 is formed with an upstanding collar 46 (see FIG. 1) that provides a seat for a compression spring 47. The compression spring 47 resiliently supports a cylinder of filter material 48 that will be described in detail hereafter and identified as the second filter element or media.

The filter cartridge 40 includes a first filter media 51 that is formed from a pleated sheet of impregnated paper or similar filtering material with said pleated sheet-like material 51 being shaped to provide a hollow cylinder as clearly indicated in FIG. 2. This pleated sheet-like filter media 51 has its lower end seated on an imperforate lower plate 41 or end cap and its upper end is capped by an imperforate washer-like disc 53. Disc or cap 53 may have a recessed formation 54 in its center portion so as to provide a bottom seat for a compression spring 55. The compression spring 55 reacts between the top disc or end cap 53 and the top wall 24 of the filter unit casing so as to anchor the filter cartridge 40 within the filter unit casing.

An aperture 57 pierces the center of the recessed portion 54 of the top cap disc 53 so as to provide a valve port between the casing interior chamber 36 and the bore area 61 located interiorly of the hollow cylindrical filter media 51. Valve port 57 is adapted to be closed by a valve plate 58 that is supported by a compression spring 59. Compression spring 59 is mounted in a perforated basket-like container or bale 60 that has its upper edge fixedly connected to the end cap 53 by welding or a similar connector means as indicated at 62. It will be noted that the basket or bale 60 seats within an enlarged recess 64 formed in the upper central portion of the secondary cylindrical filter media 48. The upper end of the cylindrical filter media 48 carries an upstanding rubber-like sealing ring 66 that is adapted to sealingly seat against the underside of the recessed portion 54 of the filter cartridge top disc 53.

The three stage filtering operation obtainable with the filter unit shown in FIGS. 1 through 5 will now be described. Assuming a relatively clean filter unit is being used at the beginning of the filtering operation, the oil supplied to the filter unit through supply conduit 18 enters the supply chamber 21 and because of its pressure head raises the one-way valve disc 34 so that the fluid to be filtered is passed into the chamber 36 that extends around the outer peripheral area within the filter casing. The oil or other fluid media supplied to the filter area 36 will pass through the first stage filter media 51 as indicated by the arrows 70 and the filtered oil is then directed through the perforated inner sleeve or tube 42 and down through the outlet conduit 17 for recirculation through the engine block 14. As the foreign matter removed from the fluid passed through the filter unit 10 begins to load and close off passage through the first stage filter media 51 a fluid pressure is built up within the casing of the filter unit 10 and when this fluid pressure reaches a predetermined value, such as 8 or 9 lbs. per square inch, then the spring support valve plate 58 is depressed as shown in FIG. 4 and the majority of the oil now passing through the filter unit 10 is no longer filtered by the first stage filter media 51 when valve plate 58 has been depressed. It can now be considered that the filter unit is in the second stage of its filtering operation wherein the majority of the filtering operation is performed by the second stage cylinder of filtering media 48. The arrows 71 in FIG. 4 indicate the flow path for the major portion of the fluid that is now being processed during the second stage filtering operation. It will be noted that the major portion of the fluid now enters the interior of the pleated paper filter element 51 by way of the valve port 57 and passes downwardly through the second stage filter element 48 by virtue of the recess 64 in the upper end portion of the filter element 48. The filtered fluid passing through the filter element 48 then passes downwardly through the perforated sleeve or tube 42 and leaves the filter cartridge 10 by way of the outlet pipe 17. From the foregoing it is thought to be clear that because filling or loading of the first stage filter element 51 by foreign matter does not terminate the filter life of the filter cartridge 51 but merely bypasses the filterable fluid around the filter element 51 and introduces the filterable fluid to the second stage filter media 48. The porosity or filter capacities of the first stage filter elements 51 and the second stage filter element 48 may be the same or, in the alternative, the second stage filter element 48 may be more porous to take account of the fact that the surface filter area of the second stage filter element 48 is less than that of the first stage filter element 51. From FIG. 4 it will be noted that during the second stage of filtering operation the upper end of filter element 48 is sealingly engaged with the underside of the recessed portion 54 of the top disc 53 by means of the sealing ring 66.

If the filtering operation with filter unit 10 is continued after passing through the second stage of filtering operation it is possible that sufficient foreign matter will be removed from the filterable fluid such that the second stage filter element 48 will tend to become loaded and its filter capacity materially reduced. Loading or clogging of the second stage filter media 48 will cause a build-up in fluid pressure of the filterable fluid being passed into the filter cartridge interior 36 and subsequently the second stage filter element 48 will be depressed from its position shown in FIG. 4 to the position shown in FIG. 5. It has been found that a build-up in fluid pressure within the casing chamber 36 to a pressure range of 15 to 20 lbs. per square inch is sufficient to depress the second stage filter element 48 and cause compression of the supporting spring element 47. With the depression of the second stage filter element 48 to the position shown in FIG. 5, it will be noted that the filterable fluid passed into the casing interior portion 36 now follows for the most part the path indicated by the arrows 75 wherein the majority of the fluid passed into the filter unit 10 is recirculated through the fluid system with only small portions thereof passing through the loaded first stage and second stage filter elements 51 and 48, respectively.

It thus will be seen that not only is the life of a filter unit embodying this invention materially extended by virtue of the multistage filtering operation, but in addition, there are a plurality of by-pass valves which will prevent interruption to fluid circulation even when the various filter media have become inoperative. Furthermore, even when the majority of the filterable fluid is being by-passed around the several filter media, still, such filter media can still extract relatively large size foreign matter from the filterable fluid and thus prevent serious injury to the automotive engine or other machinery associated with this multistage filter unit.

FIGS. 6 and 7 show a modified form of this invention that differs in certain respects from the form of the invention shown in FIGS. 1 through 5. With the FIGS. 1 through 5 form of the invention it is possible to have what may be described as parallel flow through the first stage and second stage filter media during the second stage filtering operation. That is, while the majority of the fluid flow may be passing through the second stage filter media 48, still, there is some filtered fluid passing through the first stage filter media 51 and leaving the filter cartridge through the conduit 42, 17 without passing through the second stage filter media 48. In distinction, the form of the invention shown in FIGS. 6 and 7 is arranged to secure a series flow of all filterable fluid through the second stage filter medium 148 whenever the FIGS. 6 and 7 filter unit is operating in its so-called second stage filtering operation. The means for accomplishing this series flow during second stage filtering operation will become obvious from the description hereafter.

All parts of the FIGS. 6 and 7 modification that are identical to the similar parts shown in the FIGS. 1 through 5 form of this invention bear the same reference numerals assigned in the FIGS. 1 through 5 form. The first stage filter element 51 is supported on a lower plate or disc 141 that has its inner periphery shaped to provide an upstanding collar 142. This collar 142 is fixedly mounted on the upper end of the collar formation 19 of the casing bottom plate 30. Upstanding collar 142 not only serves as a seat for compression spring 143, but in addition, it provides a portion of a flow control valve mechanism that will be subsequently described in detail. The top plate 153 for the first stage pleated paper filter element 51 is very similar in shape to the top plate 53 shown in the FIGS. 1 through 5 form of the invention. However, the aperture in the recessed portion 154 of top plate 153 is surrounded by an upstanding collar 155 that serves as a guide means for the vertically shiftable second stage filter element 148. As was the case in the FIGS. 1 through 5 form of the invention, a compression spring 55 extends between the casing top wall 24 and the first stage filter element top disc 153 to anchor the first stage element 51 in its operative position.

The second stage filter element 148 comprises a perforated tube 160 having a reduced diameter collar 161 on its upper end that slidably seats in the collar 155 of top disc 153. Collar 161 is open ended and is perforated as indicated at 162. The lower end of tube 160 is provided with a reduced diameter downwardly extending collar 164 that is matingly and slidably received within the bottom plate upstanding collar 142. This lower end tubular collar 164 is perforated as shown at 165 to provide a horizontally aligned row of valve ports for a purpose that will be subsequently described.

Extending longitudinally of the second stage filter element 148 between the upper collar portion 161 and the lower collar portion 164 is a stepped tubular member 170. Tubular member 170 has a cylindrical upper end portion 171 that contains a compression spring 172 that supports a valve plate 173. Valve plate 173 closes off the lower end of the tubular collar 161. The major portion of the length of the tubular element 170 comprises a perforated tube 175 that has a radially outwardly extending foot portion 176. Foot portion 176 is perforated as shown at 177. The interior of the tubular member 160 is filled with a second stage filtering media such as sisal, fiber glass, cotton batting or some similar filtering material 180.

Operation of the multistage filter unit shown in FIGS. 6 and 7 will now be described. FIG. 6 shows the filter unit elements arranged such that the unit can be considered to be operating in its first stage of filtering operation. At this time filterable fluid from the supply conduit 18 is passed through the one-way valve controlled supply ports 32 and into the casing interior cavity indicated generally by the reference numeral 36. The fluid passes from cavity 36 through the first stage pleated filter element 51 as indicated by the reference numerals 181. After passing through the first stage filter element 51 the filtered fluid will take the path of least resistance and flow downwardly through the open ports 165 in the lower tubular end portion 164 of the second stage filter element 148. Fluid passing through ports 165 is directed into discharge pipe 17 and recirculated through the associated engine block 14. As the first stage filter media 51 becomes clogged or loaded and its filter capacity is materially reduced a fluid pressure head is built up within the casing chamber 36 and this pressure head reacts against the upper end of the second stage filter element 148 and causes depression of the second stage filter element 148 by virtue of compression of the spring 143 (see FIG. 7). The spring 143 is preferably set to be compressed when the pressure head within the chamber 36 has approached 8 to 9 lbs. per square inch. With the filter unit elements in the condition shown in FIG. 7, it will be noted that the filterable fluid from chamber 36 enters the open upper end of the tubular portion 161 and passes downwardly through the ports 162 into the area 187 as indicated by the arrow 188. Filterable fluid in the area 187 can then pass inwardly through the perforated casing 160 of the second stage filter element 148 and after passing through the filter material 180 the filtered fluid is discharged into the perforated tubular portion 175 as indicated by the arrows 189. Fluid discharged into the perforated tubular portion 175 passes downwardly through the lower tubular element 164 and exits from the filter unit by way of the discharge pipe 17. It will be noted that with the depression of second stage filter element 148, as shown in FIG. 7, the valve ports 165 in the lower tubular element 164 are now closed off by the upstanding collar portion 142 of the filter cartridge bottom plate 141. Because of the closing off of the ports 165 during the second stage of filtering operation, it is impossible for a parallel flow path to exist through the first stage filter element 51 and the second stage filter element 148. All flow during the second stage of filtering operation is now a series flow through the first stage filter element 51 and the second stage filter element 148 or solely flow through the second stage element 148 if first stage filter element 51 is completely closed off because of loading or clogging of the filter element 51.

The third stage of filtering operation with the filter unit shown in FIGS. 6 and 7 is obtained when the second stage filter element 148 becomes sufficiently clogged to build up a pressure head within the chambers 36 and 187 such that the spring supported plate valve 173 will be depressed from its full line position shown in FIG. 7 to the depressed broken line position indicated by the reference numeral 173a. Depression of the plate valve 173 is preferably set to occur when the back pressure within the casing 36 is approximately 15 to 20 p.s.i. When plate valve 173 has been depressed and the so-called third stage of filtering operation is brought into existence, then fluid flow is from chamber 36 through the tubular upper end of collar 161 of the second stage filter element 148 and then through opened valve 173 into the interior of cylinder 171. Fluid within cylindrical chamber 171 is discharged through the lower end thereof into the perforated tube 175 that feeds the discharge pipe 17 at the lower end of the filter unit 10. During the third stage of filtering operation, with the filter unit shown in FIGS. 6 and 7, a substantially free flow of lubricant is insured for lubrication purposes and, furthermore, any large particles of foreign matter contained within the filterable fluid will presumably be deposited on one or the other of the filter elements 51 and/or 148 even though these filter elements may be operating at a very reduced efficiency.

FIGS. 8 and 9 show a third form of this invention that is very similar to the form of the invention shown in FIGS. 6 and 7, but varies therefrom in one material respect. All parts of the FIGS. 6 and 7 structure that are identical in the FIGS. 8 and 9 form of the invention bear identical reference numerals. The basic distinction between the FIGS. 6 and 7 form and the FIGS. 8 and 9 form is that the casing 260 of the second stage filter element 248 is imperforate. By using an imperforate casing 260 for the second stage filter element 248 it means that all fluid being passed through this form of filter unit, during its second stage of filtering operation, passes through only the second stage filter element 248. Stated differently, it can be said, that when the first stage filter element 51 becomes clogged or loaded to such an extent that the fluid pressure head in casing area 36 causes the second stage filter element 248 to be depressed as shown in FIG. 9, then there is no longer any fluid flow through the first stage filter element 51 because of the closing of valve ports 165 at the lower end of filter element 248. At this time all fluid entering the casing chamber 36 follows the course of the arrows 190 which passes the fluid flow through the aligned valve ports 153a and 262 and into the fibrous second stage filter media 280. To assist in distribution of the filterable fluid through the fibrous media 280, perforated distributor pipes 295 are arranged to extend lengthwise of the second stage filter media 280. All fluid passing through the distributor pipes 295 and the second stage filter media 280 is discharged through the perforated pipe 275 and the ports 298 in the lower end of the second stage filter unit 248. The third stage of filter operation with the FIGS. 8 and 9 form of the invention occurs when the pressure head in the casing chamber 36 reaches a value sufficient to depress the plate valve 173. The third stage of filter operation is identical to that heretofore described with respect to the FIGS. 6 and 7 form of the invention and it occurs when the plate valve 173 is depressed to its broken line position 173a.

From a look at FIGS. 8 and 9 it will be noted that the top end of the secondary filter element casing 260 has an inverted cup-like formation 263 that is arranged to be matingly and slidably received within the collar 161 on the top cap plate 153 of the primary filter element 51. The cup 263 not only guides the movement of the vertically shiftable secondary filter element 248, but it also provides a portion of the valve mechanism for controlling fluid flow during the second and third stages of the filtering operation. It will be noted that the cup top end 264 is closed or imperforate so that the fluid pressure head in casing chamber 36 is applied to top 264 when the filter unit is in its FIG. 8 first stage filtering condition. At this time the valve ports 262 in the side wall portions of the cup formation 263 are closed off by the upstanding collar 161 on the top cap plate 153. As the pressure head in chamber 36 increases a pressure point is reached where the force of lower spring 143 is overcome and the second stage filter element 248 is depressed to the position shown in FIG. 9. At this time the valve ports 262 in the cup 263 will become aligned with the valve ports 153a in the collar 161 and fluid flow now begins to pass into and through the second stage filter element 248 by way of the perforated distributor pipes 295. At this time valve ports 165 are closed by imperforate collar 242 so there is no flow through the first stage filter element 51.

From the foregoing description of the FIGS. 8 and 9 form of this invention it is clear that the first and second stage filter media 51 and 248, respectively, are not and cannot be arranged for parallel flow of the fluid to be filtered. On the contrary the filtering operation is sequential, that is, during the first stage by only the filter element 51 and during the second stage by only the filter element 248. The third stage of filtering operation, with the FIGS. 8 and 9 form of this invention, occurs when the valve plate 173 has been depressed to the broken line position indicated by reference numeral 173a. At this time the fluid flow by-passes both of the filter elements 51 and 248 and only large particles of foreign matter such as can not pass through the valve ports 153a, 262 or particles that might adhere to the surfaces of the filter elements 51 and 248 will be separated from the fluid passing through this filter unit.

Another feature that is common to each of the several forms of the invention herein disclosed, is the tool receiving nut formation 200 that is incorporated in the top wall 24 of the filter unit casing. This nut formation is adapted to receive a wrench or a similar torque applying means to facilitate the application and removal of the filter unit 10 to the threaded stud or nipple pipe 17 that is carried by the engine block 14. FIG. 10 shows a top plan view of this nut formation 200. In order to permit the use of certain torque applying wrenches that are currently in the hands of service garages and the like, the upper end of the side wall sleeve 23 of the filter unit casing has a peripheral band of flatted surfaces 210 that can also be used to threadably connect the filter unit 10 to or disconnect it from the associated engine block nipple 17. No claim is made in this application for these torque applying features as they are considered a separate invention from the filtering units that have been disclosed.

I claim:

1. A multistage filter unit comprising a hollow, substantially cylindrical, casing having one closed end and the other end portion closed except for a pair of ports providing respectively fluid inlet and outlet ports for the casing, a first, substantially cylindrical, hollow, filter element, mounted concentrically within and spaced from the interior walls of said casing with the bore of said first filter element extending longitudinally of the casing and substantially aligned with and connected to the casing outlet port, said first filter element providing a first stage of filtering action, a second pre-formed, substantially bar-shaped, fibrous, filter element mounted in and arranged for movement longitudinally of the bore in said first filter element, and a first pressure fluid responsive valve means carried by the upper end of said second filter element to control fluid flow through a first portion of said bore and through said second filter element to provide a second stage of filtering action, and a second pressure fluid responsive valve means carried by said second filter element to control fluid flow through a second portion of said bore for by-passing said second filter element.

2. A three-stage filter unit comprising a hollow, substantially cylindrical, casing having one closed end and the other end portion closed except for a pair of ports providing respectively fluid inlet and outlet ports for the casing, a first, substantially cylindrical, hollow, filter element, mounted concentrically within and spaced from the interior walls of said casing with the bore through said first filter element extending longitudinally of the casing and connected to the casing outlet port, said first filter element having the opposite upper and lower ends thereof capped and the caps pierced by the bore ends, a second pre-formed, bar-like, fibrous filter element resiliently mounted in and arranged for movement longitudinally of the bore in said first filter element, a first, normally closed pressure fluid responsive valve means carried by the upper end of said second filter element and connected to the bore opening through one end cap of said first filter element and arranged to open at a relatively low pressure to control fluid flow through said second filter element by-passing said first filter element, and a second normally closed pressure fluid responsive valve means carried by said second filter element arranged to open at a relatively high pressure to control fluid flow through said bore for by-passing said second filter element.

3. In a filter unit as set forth in claim 2 wherein one of said valve means comprises a resilient support for said second filter element that provides for shiftable movement of said second filter element into and out of valve sealing engagement with portions of said first filter element in the bore of said first filter element in response to variation in the fluid pressure head in said casing.

4. In a filter unit as set forth in claim 2 wherein said second filter element has a valve controlled conduit extending therethrough and the exterior surface thereof is perforated to pass fluid admitted to the bore in said first filter element through said first valve means.

5. In a filter unit as set forth in claim 2 wherein said second filter element has a valve controlled conduit extending therethrough and the exterior surface thereof is imperforate to prevent the passage therethrough of fluid entering the bore in said first filter element through said first valve means.

6. In a filter unit as set forth in claim 2 wherein said second filter element has a valve controlled conduit extending therethrough and wherein said second filter element has distributor ducts extending therethrough.

7. A multistage filter unit adapted to be connected to the fluid circulating system of a piece of machinery comprising a tubular casing having a first end plate closing one end of the casing and a second end plate extending across the other end of said casing and adapted to be sealingly connected to said piece of machinery, said second end plate having a fluid inlet port and a fluid outlet therethrough, a first, pleated sheet, hollow, cylindrical filter element fixedly mounted in and extending lengthwise of said casing with the opposite upper and lower ends of said first filter element being closed by imperforate caps each having a centrally located opening therethrough connected to the bore through said first filter element, a first normally closed, fluid pressure responsive valve mechanism closing the upper end of the centrally located bore through said first hollow filter element and arranged to open at a first predetermined, relatively low, fluid pressure head in said casing, a second, pre-formed, fibrous filter element resiliently supported in said centrally located bore in said first hollow filter element for movement longitudinally thereof, said second filter element mounting said first valve mechanism, and positioned to receive and filter the fluid passed through said first valve mechanism, said second filter element carrying valve means normally being sealingly connected to adjacent portions of said first filter element with the resilient support for said second filter element being fluid pressure responsive so that fluid flow through said first valve mechanism will pass through said second filter element until a second predetermined, relatively high fluid pressure head is developed in said casing at which time the sealed connection of said second filter element valve means to said second filter element is opened and fluid flow through said first valve mechanism by-passes said first and second filter elements and passes directly from said casing inlet port to the outlet port in said second casing end plate.

8. A multistage filter unit adapted to be connected to the fluid circulating system of a piece of machinery comprising a tubular casing having a first end plate closing one end of the casing and a second end plate extending across the other end of said casing and adapted to be sealingly connected to said piece of machinery, said second end plate having a fluid inlet port and a fluid outlet therethrough, a first, pleated sheet, hollow, cylindrical filter element fixedly mounted in and extending lengthwise of said casing with the opposite ends of said first filter element being closed by imperforate upper and lower caps each having a centrally located opening therethrough connected to the bore through said first filter element, a first normally closed, fluid pressure responsive valve mechanism closing the upper end of the centrally located bore through said first hollow filter element and arranged to open at a first, relatively low, predetermined fluid pressure head in said casing, a second, pre-formed, fibrous filter element resiliently supported in said centrally located bore in said first hollow filter element mounting said first valve mechanism and positioned to receive and filter the fluid passed through said first valve mechanism, said second filter element normally being shiftably and sealingly valve connected at its upper and lower ends to portions of said first filter element with the resilient support for said second filter element being fluid pressure responsive so that fluid flow through said first valve mechanism will pass through said second filter element until a second predetermined, relatively high fluid pressure head is developed in said casing at which time a second valve connection at the upper end of said second filter element is opened and fluid flow through said first and second valve mechanisms at the upper end of said second filter by-passes said second filter element and passes directly to the outlet port in said second casing end plate through a by-pass conduit extending through said second filter element.

References Cited by the Examiner
UNITED STATES PATENTS

| | | | |
|---|---|---|---|
| 2,203,668 | 6/1940 | Burckhalter | 210—439 |
| 2,617,535 | 11/1952 | Hamilton | 210—443 X |
| 2,884,133 | 4/1959 | Walulik et al. | 210—130 X |
| 2,998,138 | 8/1961 | Mould et al. | 210—315 X |

REUBEN FRIEDMAN, *Primary Examiner.*

SAMIH ZAHARNA, *Examiner.*

F. A. SPEAR, *Assistant Examiner.*